Patented Apr. 20, 1943

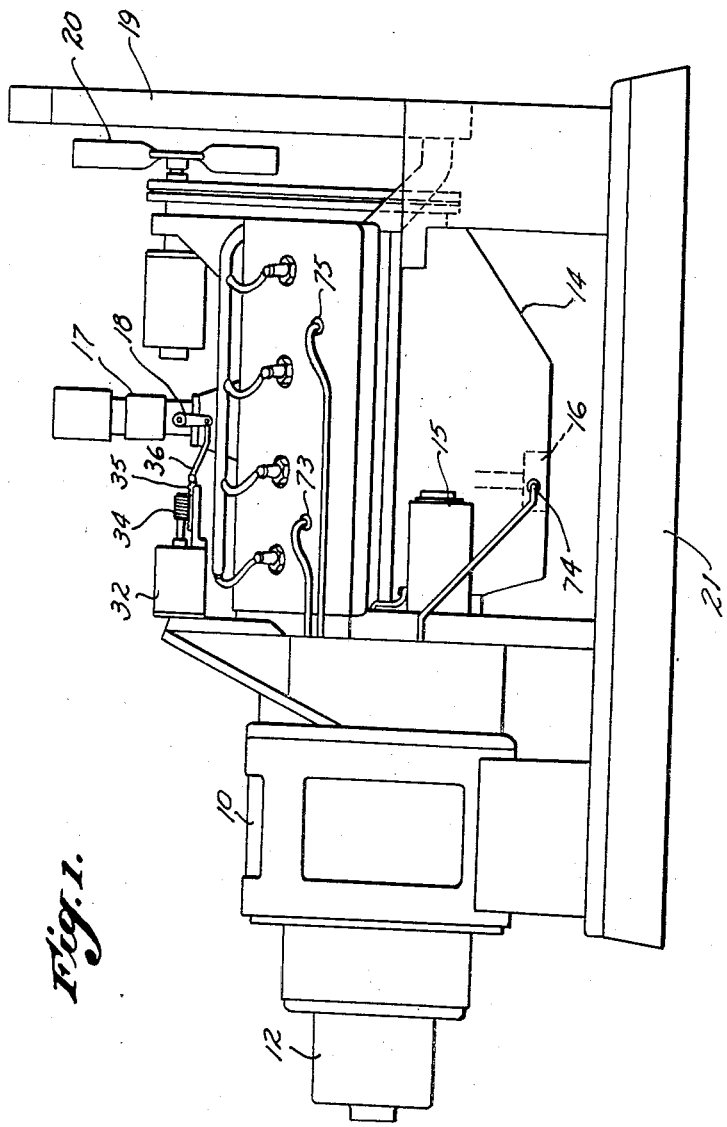

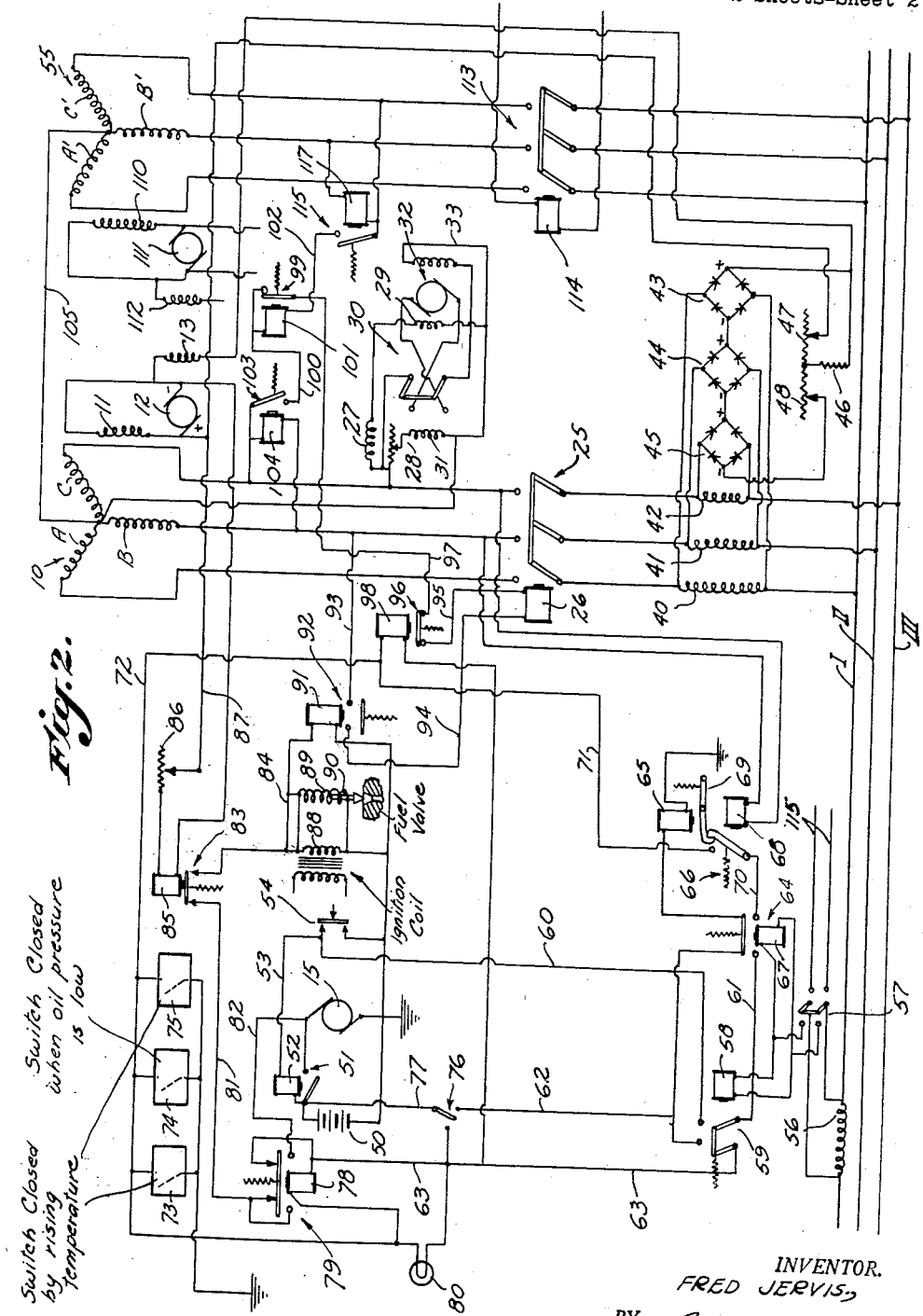

2,317,062

UNITED STATES PATENT OFFICE 2,317,062

ALTERNATOR CONTROL SYSTEM

Fred Jervis, Los Angeles, Calif., assignor, by mesne assignments, to Bardco Manufacturing & Sales Company, Dayton, Ohio, a corporation of California Original application May 3, 1941, Serial No. 391,741. Divided and this application July 3, 1942, Serial No. 449,583

5 Claims. (Cl. 290—41)

The invention relates to control systems for electric generating plants, and particularly to plants including an alternating current generator driven by an internal combustion engine, and is a division of my co-pending application Serial No. 391,741, filed May 3, 1941, and entitled Alternator control system, which was a division of my original application Serial No. 230,262, filed September 16, 1938, and entitled Control system for electric generating plants, now Patent No. 2,255,743.

An object of my invention is to provide, in an electric generating plant including an internal combustion engine as prime mover, means for manually starting the internal combustion engine, or automatically starting it in response to the demand for electric current in the circuit to which the generator is adapted to be connected.

Another object is to provide means for automatically synchronizing a generator with another and connecting it in parallel therewith.

Another object of the invention is to provide safety and alarm means for disconnecting the generator from the line, stopping the prime mover, and energizing an alarm signal when any of various dangerous conditions arise in the plant, such as excessive speed, excessive cooling water temperature, low oil pressure, etc.

A further object is to provide means for making inoperative the starting means when voltage on the generator reaches a predetermined value and for maintaining the starting means in inoperative condition so long as the load on the line to which the generator is connected is such as to normally cause automatic starting of the generator.

Still another object is to provide a practical, dependable, and fool-proof control for an electric generating plant in all of its important functions.

These and other apparent objects I attain in a manner which will be clear from consideration of the following description taken in connection with the accompanying drawings, of which:

Fig. 1 shows an electric generating plant and various elements of my control system installed thereon.

Fig. 2 is a diagrammatic illustration of the electric circuit of my control system shown in connection with 3-phase alternating current generators.

My control system is illustrated in connection with 3-phase alternating current generators and an internal combustion engine, but it will be understood that many of the features of the invention are adaptable to other types of electric generator and other sources of motive power.

In the drawings, numeral 10 designates a 3-phase alternator having armature windings A, B, and C adapted to have induced therein alternating electromotive forces having phase relations represented by the angular positions of the windings. The alternator field 11 is supplied with direct current from a suitable source such as exciter 12 provided with a field 13. The alternator 10 is shown mechanically coupled to an internal combustion engine 14 on one side and the exciter 12 on the other. An electric starting motor 15 is provided, adapted to engage a moving part of the engine for rotating it to effect starting. An oil pump 16 is adapted to be actuated by the engine and to force lubricating oil under pressure to the bearings of the engine. Numeral 17 designates the carburetor or other fuel control device and is operated by movement of throttle arm 18 to increase or decrease by supply of fuel to the engine. Radiator 19 is provided in connection with the engine water jackets for cooling the engine and fan 20, driven by the engine is adapted to force air through the radiator. The whole assembly is preferably mounted on the frame 21.

The three windings A, B, and C of alternator 10 are connected to one side of an electromagnetic switch 25 adapted to be normally open and to be closed by energization of coil 26. The opposite terminals of switch 25 are connected to the bus bars I, II, and III in such manner that closing of the switch connects windings A, B, and C respectively, to buses I, II, and III.

A feature of my invention is the provision of means for controlling the frequency of the E. M. F. generated by the alternator. Two electric circuit elements differing in their reactive character, such as an inductance coil 27 and a resistance 28, are connected in parallel relation across one winding of the alternator 10, there being an actuating coil 29 of relay 30 in series with inductance 27 and another actuating coil 31 of the same relay in series with resistance 28, these two parallel circuits thus forming circuits of different power factor. The relay 30 is a double pole, double throw relay, normally held in open position, but adapted to be closed toward the right in Fig. 2 by electromagnetic energization of coil 29 and to be closed toward the left by electromagnetic energization of coil 31. When the currents through coils 29 and 31 are equal, there is no tendency for the switch arms to be moved from open position the magnetic effects produced by the currents in the two coils being equal and opposed; but when the current through either of these actuating coils exceeds that through the other, its magnetic effect on the switch predominates, the switch is closed in the corresponding direction. A small motor 32 having a field 33 is preferably connected to the relay switch 30 and to the alternating current supply as shown in such manner that the relay switch 30 acts as a reversing switch to reverse the field 33 with respect to the armature of motor 32 to cause the direction of rotation to be reversed. The motor 32 is operatively connected to the throttle arm 18 of the carburetor 17 of the engine 14 as by the worm 34, rack 35, and link 36 to move the throttle arm upon rotation of the motor 32. The connections are such that closing of the relay 30 to the left position in Fig. 2 results in rotation of the motor 32 in such a direction as to decrease the fuel supply to the engine.

The operation of the frequency control means may now be understood. Since the current through an inductive reactance such as coil 27 decreases as the frequency of the applied voltage increases, and the current through a resistance such as resistance 28 remains substantially constant as the frequency changes, it will be clear that if the frequency rises, the current through coil 29 of relay 30 will be decreased while the current through coil 31 will remain nearly the same. The relay will then close to the left position, causing the motor 32 to rotate in such direction as to decrease the fuel supply and reduce the speed of engine 14. The frequency will drop correspondingly until the currents through coils 29 and 31 of the relay 30 are again balanced to permit the relay to open. Should the frequency drop below this equilibrium value, the current through inductance 27 and relay coil 29 will increase while the current through resistance 28 and coil 31 will remain nearly constant. The relay 30 will, therefore, close to the right and cause the motor 32 to rotate in such direction as to increase the fuel supplied to the engine, whereupon the engine will increase in speed and cause the frequency to rise again to its equilibrium value. The resistance 28 is preferably variable, and by changing its value, the equilibrium frequency at which the relay 30 is in balance may be altered. For best results, the reactance of coil 31 is preferably small compared with resistance 28. It will be understood that combinations of circuit elements other than an inductance and a resistance may be employed in place of inductance 27 and resistance 28 as, for example, a condenser and a resistance, or a condenser and an inductance, the essential requirement being that the two elements employed differ in their relative change in impedance resulting from change in frequency so as to provide two parallel circuits of different power factor.

The voltage of the alternator is maintained substantially constant by suitable regulating means, regardless of the load. I prefer to employ for this purpose a voltage regulator which is the invention of Oliver A. Perry, and is the subject of his Patent No. 2,236,880, issued April 1, 1941. I do not claim this regulator, per se, as my invention. In this regulator, current transformers 40, 41, and 42 are connected in the three lines leading to bus bars I, II, III respectively. The secondaries of these transformers are connected, respectively, to the input terminals of the full-wave rectifiers 43, 44, and 45, which are preferably of the dry oxide type. The output terminals of the rectifiers are connected in series, as shown. The shunt field 13 of exciter 12 is in series with the fixed resistor and the variable resistance 47, the latter being employed to vary the no-load voltage of the exciter. The three rectifiers are connected in series with variable resistance 48 and across resistor 46 in such manner that the output from the rectifiers is applied across resistor 46 through resistance 48.

The adjustment of the resistance 48 thus controls the potential difference across resistor 46 due to current from the rectifiers. The positive terminal of the series of rectifiers is connected to that side of the exciter field circuit that leads to the negative terminal of the exciter in such manner that potential difference due to the rectifier bank adds to that of the exciter armature to increase the exciter field current.

In the operation of the voltage regulator, the variable resistance 47 is set to secure the desired no load voltage on the alternator, and as the load builds up in any one or all phases of the alternator, potential differences will, by reason of transformers 40, 41, and 42, be applied to the rectifiers 43, 44, and 45. These rectifiers will rectify these A. C. potential differences, and the rectified D. C. potential differences will be applied through resistance 48 to the excited field circuit. When the polarities are as described above, this potential difference due to the rectifier bank tends to increase the current through exciter field 13, which raises the exciter voltage, which in turn raises the alternator voltage to compensate for the drop in voltage normally caused by an increase in load on the alternator. The resistance 48 is adjusted to provide just the proper amount of compensation required by the particular alternator 10 employed and the power factor of the load to be encountered. If desired, the resistance 48 may be set for over-compensation to correct for line drop. When properly adjusted, then, the line voltage at a selected point will be held substantially constant for any load on the alternator; and since the rectifiers 43, 44, and 45 are connected in series, the voltage compensation will be unaffected by an unbalance of the load between phases.

The electric starting motor 15 for the engine 14 is connected in circuit with a suitable source of electric current, such as a storage battery 50, through an electromagnetic switch 51 which is normally open but which is closed by energization of coil 52. One terminal of the battery 50 is preferably grounded to the frame 21. One side of coil 52 is connected to the ungrounded terminal of battery 50, and the other side leads by conductor 53 to one terminal of a push button switch 54, the other side of which is grounded. For manual starting of the engine the switch 54 is closed which completes the circuit through the coil 52, whereupon the switch 51 closes sending current through the motor 15.

My generating plant may be employed in standby service to take a share of the load when the current through buses I, II, and III, which may normally be supplied from another source, such as alternator 55, increases to more than a predetermined value. I, therefore, preferably provide means for automatically starting the engine 14, synchronizing alternator 10 with the line, and connecting it therewith. Installed preferably in one of the main buses, such as I, is a series transformer 56 whose secondary is connected to a double pole, double throw switch 57 adapted, when closed in one direction, to connect the secondary of transformer 56 to the actuating coil 58 of a double pole electromagnetic switch 59. The switch 59, which is normally held open and is closed when coil 58 is energized, has one pole adapted to connect conductors 60 and 61, and the other pole adapted to connect conductors 62 and 63. Conductor 60 is connected to conductor 53. Conductor 61 leads to one terminal of the relay switch 64, which in the normal upper position connects conductor 62 with the grounded latch release coil 65 of relay 66; and in the lower position, occupied when coil 67 is energized, connects conductor 61 through conductor 70 to one terminal of the switch of relay 66. The switch of relay 66 is normally held closed and is opened when coil 68 is energized. The coil 68 is connected across one phase of the alternator 10. The relay 66 has a mechanical latch 69 adapted to hold open the switch until the latch is lifted by energization of coil 65. The switch of relay 66 when closed connects conductors 70 and 71, the latter connecting with conductor 72 to which are connected one terminal of each of safety switches 73, 74, and 75.

Switches 73 and 75 are indicated as temperature responsive switches adapted to close and connect conductor 72 to ground when they reach a certain elevated temperature. Such switches are well-known in the art. Switches 73 and 75 are preferably located in parts of the apparatus where it is desired that the temperature shall always remain less than a certain selected value. I preferably locate switches 73 and 75 in the head of the engine 14 and adjust the switches to close when the temperature of the head approaches the boiling temperature of the circulating cooling fluid within. The switch 74 is indicated as a pressure responsive switch adapted to connect conductor 72 to ground when the pressure falls below a certain selected value. Such switches are well-known in the art. The switch 74 is preferably connected to the discharge passage of the oil pump 16 of the engine. Since when the engine is running and the pump 16 is operating normally, pressure is applied to switch 74, it will be open; but when the engine is stationary or the pump is not supplying oil under pressure to the bearings, the switch 74 will close and connect conductor 72 to ground.

Conductor 62 leads to one terminal of single pole, double throw switch 76 which when closed to the right connects conductor 77 with conductor 62, and when closed to the left connects conductors 77 and 63. Conductor 77 is connected to the ungrounded side of the battery. Conductor 63 is connected to one terminal of the coil 78 of relay 79, the other terminal of which is connected to conductor 72. An alarm signal 80, which may, for example, be a red lamp or a sound-producing device such as a bell, is connected across the coil 78. The relay 79 is normally in the upper position, connecting conductor 63 with conductor 81, and is moved by energization of coil 78 to the lower position in which conductor 81 is connected through conductor 82 to the ungrounded terminal of starting motor 15. The conductor 81 leads to relay switch 83 which is normally held closed, connecting conductor 81 to conductor 84. The relay switch 83 is opened by energization of coil 85 which is supplied through rheostat 86 by conductors 87 connected to the terminals of the exciter 12. The ignition coil 88 of engine 14, the coil 89 of electromagnetic fuel valve 90, and actuating coil 91 of relay switch 92 are connected between conductor 84 and ground. The fuel valve 90 is preferably inserted in the fuel line to the engine and is normally closed, but opened when coil 89 is energized.

The relay switch 92 is normally held open but is closed by energization of coil 91 to connect conductors 93 and 94. Conductor 93 leads to one line of the alternator 10, for example that connected to winding B, while conductor 94 connects to one terminal of coil 26. The other terminal of coil 26 is connected through conductor 95 to relay switch 96 which, when in its normal closed position, connects conductor 95 with conductor 97. The relay switch 96 is opened when coil 98 is energized. The coil 98 is connected between conductors 63 and 71. Conductor 97 is connected by relay switch 99, when in its normal closed position, with conductor 100. The relay switch 99 is opened by energization of coil 101 which is preferably connected between conductor 100 and conductor 102. The conductor 100 is connected to one terminal of relay switch 103 which in its closed position connects conductor 100 with a line of alternator 10 different from that to which conductor 93 is connected, for example, the line connected to winding C. The relay switch 103 is normally held open and is closed when coil 104 is energized to a suitable degree. The coil 104 is connected between two of the outgoing power lines from alternator 10, for example, those connected to windings B and C.

I have illustrated my invention as applied to the case in which the buses I, II, III are supplied by alternator 55 which is provided with a field 110, and an exciter 111 having a field 112. The windings A', B', and C' of alternator 55 may be connected to buses I, II, and III, respectively, through electromagnetic switch 113 which is closed by energization of coil 114. The connections of the two alternators 10 and 55 to the buses I, II, and III are such that the phase rotation of each alternator is the same relative to the buses to which it is connected, as shown. The neutrals of the windings of alternators 10 and 55 may be connected through conductor 105. In my installations, alternators 10 and 55 may be, and usually are, identical, the alternator 55 being equipped with voltage regulating means, frequency regulating means, starting means, safety and alarm means similar to that above described in connection with alternator 10. The connection of these various devices will be obvious in view of the foregoing description. Inasmuch as either alternator may in practice be placed on the line first, and the other be automatically started and placed on the line when its services are required, the series transformer 56 may serve to connect the starting apparatus for either one or the other of the alternators. If switch 57 is thrown to the left in Fig. 2, the starting apparatus of alternator 10 will be connected; while if switch 57 is thrown to the right, the starting apparatus of alternator 55 will be connected through conductors 115.

For purposes of synchronizing the two alternators, the actuating coil 101 of relay 99 is connected through conductor 102 to the switch of relay 116, the other terminal of which is connected to the winding of alternator 55 (in this case winding C') to which is adapted to be connected the winding C of alternator 10 to which the relay switch 103 is connected. The relay 116 is normally held open but is closed by energization of coil 117 to a suitable degree. The coil 117 is connected between windings B' and C' of alternator 55.

In describing the operation of the apparatus of my invention, I shall assume the alternator 55 connected through switch 113 with the buses I, II, and III and supplying electrical energy to the buses at a substantially constant voltage. If the engine 14 is to be started manually, the switch 76 is closed to its left position, in which the ignition coil 88, fuel valve electromagnet 89, and relay coil 91 are energized through a circuit including relay switch 83, conductor 81, relay switch 79 in its upper unoperated position, conductor 63, switch 76, and conductor 77. The push button switch 54 is then operated to connect the starting motor as previously described. If it is desired to have the alternator 10 started and connected automatically to take its share of the load, the switch 57 is closed to the left in Fig. 2, the switch 76 is thrown to the right position connecting conductors 77 and 62, and the operation is as follows:

As the load current in bus I is increased, a condition will be reached, depending upon the adjustment of relay 59, at which the induced E. M. F. in the winding 56 is sufficient to energize coils 58 and 67 and cause operation of relays 59 and 64. Current will then flow from the ungrounded side of battery 50 through coil 52, conductor 53, conductor 60, relay 59, conductor 61, relay 64, and conductor 70 to the switch of relay 66. Since neither coil 65 nor 68 are energized, the switch of relay 66 will be closed. The current will, therefore, pass from conductor 70 through relay 66, to conductor 71, and on to conductor 72. Since the engine 14 is stationary, there is no oil pressure and switch 74 is closed. The current, therefore, passes through switch 74 to ground, completing the circuit. The current passing in this manner through coil 52 closes relay 51 and permits current from the battery 50 to pass through the starting motor 15 to ground, and the starting motor turns the engine which presently starts. While this is occurring, current also passes from the ungrounded side of the battery 50 through conductor 77, switch 76, relay 59, conductor 63, coil 78, conductor 72, and oil pressure switch 74 to ground. The current passing through coil 78 moves the switch of relay 79 to its lower position. Current then passes through relay 51, conductor 82, relay 79, conductor 81, relay 83, which is now closed, to the ignition coil 88, fuel valve 89, and coil 91, and through each of these elements back to ground. In this manner the ignition circuit of the engine 14 is energized, and the fuel valve is opened permitting fuel to flow to the engine. Current passing through coil 91 closes relay 92.

When the engine starts, oil pressure quickly builds up, opening switch 74. The circuit through coil 52 is thus interrupted, opening relay 51, and disconnecting the starting motor 15. At the same time, the circuit through coil 78 is interrupted, permitting the switch of relay 79 to be returned to its upper position. In this position, current comes from conductor 63, passes through relay 79, to conductor 81, and on to energize the ignition circuit, fuel valve, and coil 91 as before.

As the speed of the engine 14 increases, the voltage of the alternator 10 also increases, the voltage regulating means and the frequency regulating means coming into operation to produce a predetermined voltage and frequency. The relay 103 is adjusted to close at a voltage just below that for which the field excitation and voltage regulator are set. Accordingly, relay 103 closes when the voltage on alternator 10 comes up to normal.

When the alternator 10 is to be started and connected to a dead line, relay 99 is found to be normally closed and when relay 103 closes, current passes from the terminal of the alternator 10 connecting with winding C through relay 103, relay 99, conductor 97, relay 96, which is normally closed, conductor 95, coil 26, conductor 94, relay 92, to the terminal of the alternator connected with winding B. Current, therefore, flows through coil 26 and closes switch 25 connecting alternator 10 with the line.

If, however, the alternator 55 is in operation supplying the line to which alternator 10 is to be connected, as I have assumed, it is necessary to synchronize alternator 10 with the line supplied by alternator 55 before connecting it thereto, and my apparatus is adapted to perform this function automatically. The normal frequency and normal voltage of alternator 10 are adjusted to be substantially equal to those of the power circuit to which it is to be connected and the frequency and voltage regulating means previously described then maintain the conditions substantially constant. The relay 116 is set to close at a voltage just below normal voltage of the alternator 55, so it will be closed at the time the alternator 10 is to be synchronized with the line. The coil 101 of relay 99 will, therefore, be connected through relays 103 and 116 between the terminal of alternator 10 connected to winding C and the terminal of alternator 55 connected to winding C'. Generally the potential with respect to neutral of the windings C and C' will be different resulting in the passage of current through coil 101 to hold relay 99 open. The relay 99 is set to close only when the current through coil 99 falls to a very low value. As the voltage of alternator 10, then, builds up and the relay 103 closes, the switch 26 is not closed immediately, but only when the potential of winding C becomes nearly equal to the potential of winding C'. When this occurs, the relay 99 will close, completing the circuit through coil 26, and the switch 25 will close to connect alternator 10 to the buses I, II, and III. It will be observed that since the alternators 10 and 55 have been connected to switches 25 and 113 with the same phase rotation, and since the voltages of the two alternators are the same, and the frequencies are substantially the same, the alternators must be in synchronism when the potential difference between windings C and C' is nearly zero, and under these conditions, it is safe to connect alternator 10 to the power circuit.

When the voltage of alternator 10 comes up to normal, coil 68 is energized, opening the relay 66. The latch 69 then holds the relay switch open until released by energization of coil 65. If during the operation of the alternator its speed should for any reason become excessively high, as might occur due to failure to the frequency regulating means, the voltage across the terminals of the exciter 12 will rise and cause relay 83, which is set to open at a voltage somewhat higher than normal exciter voltage, to open and break the circuit to the ignition coil 88, the fuel valve 89 and the coil 91. The engine 14 will then stop and since relay 92 will be opened, the current through holding coil 26 will be interrupted, resulting in opening of switch 25 and disconnecting of the alternator 10 from the line.

While alternator 10 is producing normal voltage, if the engine should for any reason become excessively hot, one of the switches 73 and 75 will close; or should the oil pressure drop to a dangerously low value, the switch 74 will close. Either of these events causes current to flow from conductor 63 through coil 78, conductor 72, and the closed switch 73, 74, or 75, to ground. Current passing through coil 78 pulls the switch of relay 79 to its lower position breaking the connection between conductor 63 and 81 through which the ignition coil 88, fuel valve coil 89, and relay coil 91 are energized. It will be observed that now when the switch of relay 79 is in its lower position, there is no connection through conductor 82 to the battery, as there was during starting, for now relay 51 is open. Hence, if either a condition of excessive engine temperature or one of low oil pressure arises, the engine will be shut down and the alternator will be disconnected from the line. At the same time, the alarm signal 80 will be energized by reason of potential difference existing across coil 78 and will indicate to an attendant that something is wrong. As additional or alternative safety means for opening the switch 25 when one of switches 73, 74, or 75 is grounded, I may employ the relay 96, and it will be apparent that current can flow from conductor 63 through coil 98, and conductor 72 to the grounded switch. This will result in relay 96 opening to break the circuit through the holding coil 26 of switch 25 and the switch 25 will then open.

Should the generator be shut down in any of the ways above described by reason of a dangerous condition existing, it will be impossible for the starting means to come into operation to again place the generator on the line unless the load on the line drops to permit relay switches 59 and 64 to open. For with the switch of relay 66 held open by latch 69, it is impossible for the starting relay coil 52 to be energized as previously explained through the circuit including conductor 70, relay 66, conductor 71, and conductor 72. This prevents alternate stopping and starting of the generator when something is wrong and before an attendant can come to investigate the cause of the alarm signal. If, however, the switch 57 is opened or the current in the line drops to such a low value as to disconnect the starting means, i. e. if the E. M. F. induced in transformer 56 is insufficient to hold relay switch 59 closed and relay switch 64 in its lower position, the relay switch 64 will be thrown to its upper position completing a circuit from conductor 63 through coil 65 to ground; and the current passing through coil 65 then releases the latch 69, and permits the switch of relay 66 to close, placing the entire system again in condition for starting of the engine.

It will be seen that I have provided a control system for an electric generating plant which is automatic in performing the necessary functions required in operation of a generating plant, and one which necessitates a minimum of attention on the part of an attendant, yet one providing a high degree of safety.

It will be understood that the embodiment of my invention disclosed herein is illustrative only, and that various changes and modifications in my system may be made by those skilled in the art without departing from the spirit and scope of the appended claims.

I claim as my invention:

1. In an electric generating plant including an electric generator and an internal combustion engine for driving said generator, said engine having an ignition circuit and an oil pressure system in which oil under pressure normally exists when said engine is running, the combination of: a switch responsive to pressure of oil in said system and closed when said pressure becomes dangerously low; a switch responsive to temperature of said engine and closed when said temperature becomes dangerously high, said switches being connected in parallel; and a relay switch adapted in the unoperated position to energize said ignition circuit and having an actuating coil included in an energizing circuit with said temperature and pressure responsive switches, whereby closing of either of said pressure or temperature responsive switches results in energization of said actuating coil, opening of said relay switch and de-energization of said ignition circuit.

2. In an electric generating plant including an electric generator and an internal combustion engine for driving said generator, said engine having an ignition coil and an oil pressure system in which oil under pressure normally exists when said engine is running, the combination of: a switch responsive to pressure of oil in said system and closed when said pressure is low; starting means for said engine operable when said switch is closed; and an energizing circuit for said ignition coil including a relay switch adapted to be moved to operated position by energization of an actuating coil, said coil being in an energizing circuit with said pressure responsive switch, said relay switch being adapted in the unoperated position to complete the energizing circuit for said ignition coil and in the operated position to connect said ignition coil in an energizing circuit which is complete only while said starting means are operating to start said engine.

3. In an electric generating plant including an electric generator and an internal combustion engine for driving said generator, said engine having a fuel valve and an oil pressure system in which oil under pressure normally exists when said engine is running, the combination of: a switch responsive to pressure of oil in said system and closed when said pressure becomes dangerously low; an electromagnetic fuel valve adapted to open when its operating coil is energized, said valve being located in the fuel supply line of said internal combustion engine; and a relay switch adapted in the unoperated position to energize said fuel valve circuit, said relay having its actuating coil included in an energizing circuit with said pressure responsive switch, whereby the closing of said pressure responsive switch results in energization of said actuating coil, opening of said relay switch, and closing of said fuel valve.

4. In conjunction with an internal combustion engine, the combination of: an electric switch adapted to be closed by the presence of a predetermined condition dangerous to the continued operation of said engine; a normally closed relay switch having its operating coil connected to said electric switch; and electromagnetic means connected to said relay and permitting the operation of said engine when energized.

5. In conjunction with an internal combustion engine, the combination of: an electric switch adapted to be closed by the presence of a condition dangerous to the continued operation of said engine; a relay switch having its operating coil connected in series with said electric switch; electromagnetic means normally energized when the operating coil of said relay is de-energized, said electromagnetic means permitting, when energized, the operation of said engine; and means permitting the energization of said electromagnetic means when said engine is stopped and said electric switch is closed.

FRED JERVIS.